United States Patent
Berentzen et al.

(10) Patent No.: US 9,244,187 B2
(45) Date of Patent: Jan. 26, 2016

(54) TOWABLE AND STEERABLE MARINE SEISMIC SOURCE ARRANGEMENT

(71) Applicant: CGG SERVICES SA, Massy Cedex (FR)

(72) Inventors: Peder Aasmund Berentzen, Sandvika (NO); Stig Runar Valdal, Oslo (NO); Svein Dale, Stømmen (NO); Peer Øyvind Toftner, Yven (NO)

(73) Assignee: CGG SERVICES SA, Massy Cedex (FR)

( * ) Notice: Subject to any disclaimer, the term of this patent is extended or adjusted under 35 U.S.C. 154(b) by 0 days.

(21) Appl. No.: 14/357,311

(22) PCT Filed: Nov. 9, 2012

(86) PCT No.: PCT/NO2012/050219
§ 371 (c)(1),
(2) Date: May 9, 2014

(87) PCT Pub. No.: WO2013/070087
PCT Pub. Date: May 16, 2013

(65) Prior Publication Data
US 2014/0347956 A1    Nov. 27, 2014

(30) Foreign Application Priority Data
Nov. 11, 2011   (NO) .................................. 20111552

(51) Int. Cl.
*B63H 25/00*   (2006.01)
*G01V 1/38*   (2006.01)
(Continued)

(52) U.S. Cl.
CPC .............. *G01V 1/3826* (2013.01); *B63B 21/66* (2013.01); *G01V 1/201* (2013.01)

(58) Field of Classification Search
USPC .......................................................... 114/246
IPC ....................... B63B 21/66; G01V 1/3826,1/201
See application file for complete search history.

(56) References Cited

U.S. PATENT DOCUMENTS

| | | | |
|---|---|---|---|
| 4,323,989 | A | 4/1982 | Huckabee et al. |
| 7,423,929 | B1 | 9/2008 | Olivier |

(Continued)

FOREIGN PATENT DOCUMENTS

| | | |
|---|---|---|
| EP | 1600795 A2 | 11/2005 |
| WO | 2004092771 A2 | 10/2004 |

OTHER PUBLICATIONS

International Search Report mailed Feb. 6, 2013, in parent application PCT/NO2012/050219.

(Continued)

*Primary Examiner* — Stephen Avila
(74) *Attorney, Agent, or Firm* — Patent Portfolio Builders PLLC

(57) ABSTRACT

A towable and steerable elongated float for a marine seismic source arrangement for use in making a seismic survey at sea, having first attachment means at a lower or bottom part of a float body for allowing at least one seismic source to be suspended from the float, and second attachment means on a fore part of the float body for attachment of a strength taking source towing line or umbilical. The float body comprises first and second elongated steering foils being attached to and spaced from respective port and starboard sides of the fore part of said float body by respective support arrangement. The steering foils have respective longitudinal steering foil axes being oriented in a direction substantially perpendicular to a longitudinal axis of the float body and so as to be substantially perpendicular to a sea surface when in use, the elongated steering foils having respective first and second chord axes. Controlling means control an angle of at least one of the first and second chord axis with respect to the float body longitudinal axis.

20 Claims, 11 Drawing Sheets

(51) Int. Cl.
   *B63B 21/66* (2006.01)
   *G01V 1/20* (2006.01)

(56) References Cited

U.S. PATENT DOCUMENTS 7,738,317 B2  6/2010  Toennessen
2007/0247971 A1  10/2007  Semb et al.
2008/0304357 A1  12/2008  Toennessen

OTHER PUBLICATIONS

Office Action mailed Mar. 3, 2015 in related AU Application No. 2012336428.
Office Action mailed Mar. 1, 2015 in related NO Application No. 201111552.

TOWABLE AND STEERABLE MARINE SEISMIC SOURCE ARRANGEMENT

FIELD OF THE INVENTION

The present invention relates to a marine seismic source arrangement for use in making a seismic survey at sea, and specifically to a towable and steerable elongated float for a marine seismic source arrangement according to the preamble of the accompanying patent claim 1.

BACKGROUND OF THE INVENTION

Marine seismic exploration includes investigating and mapping the structure and character of subsurface geological formations that underlie a body of water. A single vessel could tow seismic streamer cables and one or more seismic sources through the water. As an alternative, a tow vessel may either be a source vessel, which means it only tows one or more seismic sources, or it could be a vessel that only tows streamers, in which case two or more vessels would be used. The seismic sources may include compressed air guns or other means for generating acoustic pulses in the water. Energy from these pulses propagate downwardly into the geological formations, and is reflected upwardly from the interfaces between subsurface geological formations. Reflected energy is picked up by hydrophones of the seismic streamers, and data representing such energy is recorded and processed, whereby information about the underlying geological features is provided.

Deflectors near the vessel to pull outwardly multiple sources being towed from the direct path behind the seismic tow vessel, to maintain the transverse or crossline spacing between individual sources, rely on hydrodynamic lift created by forward motion through the water to pull the streamers and/or sources outwardly and to maintain the transverse position relative to the vessel path.

In 4-D geophysical imaging, it is important that the source members being used to generate the acoustical pulses be located as closely as possible to the same location as in previous surveys over the same grid. This has been difficult to accomplish in a marine survey because the acoustical source members are typically towed behind the tow vessel in source arrays, which are subject to wave and current movement.

Besides the deployment and operation difficulties associated with towing multiple streamers and/or multiple source arrays, conventional techniques limit the ability to position source arrays and streamers in different relative positions and orientations.

Source array design is limited by the tow configuration. Each towed source array is also subject to crosscurrents, wind, waves, shallow water, and navigation obstacles that limit the coverage provided by the survey system.

Attempts to control the location of seismic sources and source arrays have included attaching distance ropes running to lateral passive deflectors and tow cables. Use of active deflecting members attached to the source tow cables in front of the source arrays, or mid-way or at the aft end of the source arrays; and use of passive lateral deflectors equipped with a winch located near the front of the source. WO2004092771 discloses the latter two options. By attaching one or more steerable deflecting members to the front, rear, or mid-section of one or more source arrays, or a winch to the front of the source that acts on a passive lateral deflector, the source array locations may be controlled. Another method and device employs a source array comprising a rigid bar mounted under a rigid or semi-rigid float member, with the seismic source members, for example air-guns, hanging below the rigid bar.

Other solutions for controlling lateral positions of towed equipment for seismic exploration at sea are disclosed in US2008/0304357A1 and U.S. Pat. No. 7,738,317.

U.S. Pat. No. 7,423,929 discloses a steering bird for a towed seismic streamer cable, comprising a cable-steering assembly that is rotatably attached to the streamer cable. The assembly includes a body to which one or more wings are mounted, and the wings are arranged to pivot about pivot axes. An orientation sensor is employed for sensing the orientation of the wings, the cable-steering device adjusts the angle of the wings in order to provide a sideward component of force.

U.S. Pat. No. 4,323,989 discloses a steerable float for a seismic source array, having a pair of rudders at a leading edge of the float, forward of a buoyancy element. The rudders are fixedly attached to a mounting bracket forming the rudder assembly. The mounting bracket is also referred to as a support member and a cross member. The mounting bracket is connected to the leading edge of the float by a tube which forms the pivotal axis of the rudder assembly. The tube accommodates a tubular member which allows pivoting of the rudder assembly about the pivotal axis. Pivoting of the rudder assembly is controlled by an actuator coupled to a rod which is attached to a bell crank secured to the tubular member. A towing eye inserted in a reinforcing tube in a full diameter part of the float, is located adjacent to the forward end of the float, behind the rudders. The towing eye is below the horizontal center axis of the float. This assists in counteracting the rotational effects of the rudders.

The previous attempts have not provided optimal control of the location of the source arrays under varying towing conditions and different operational conditions. While these techniques are improvements in the art, further improvement is desired.

SUMMARY OF THE INVENTION

The present invention provides a towable and steerable elongated float for a marine seismic source arrangement for use in making a seismic survey at sea, having first attachment means at a lower or bottom part of the float body for allowing at least one seismic source to be suspended from the float, and second attachment means on a fore part of the float body for attachment of a strength taking towing line or source umbilical, the float body comprising first and second elongated steering foils being, by respective support arrangements, attached to and spaced from respective port and starboard sides of the fore part of said float body, the elongated steering foils having respective longitudinal steering foil axes being oriented in a direction substantially perpendicular to a longitudinal axis of the float body and so as to be substantially perpendicular to a sea surface when in use, the elongated first and second steering foils having respective first and second chord axis, and controlling means for controlling an angle of at least one of the first and second chord axis with respect to the longitudinal float body axis.

In a first aspect, the invention provides a float wherein a respective steering foil profile of each of the first and second steering foils is substantially symmetrical about the chord axis.

In a second aspect, the invention provides a float wherein the controlling means is adapted to rotate at least one steering foil about an axis of rotation being coinciding with or substantially parallel to the steering foil longitudinal axis, for directing the cord axis of the at least one steering foil at angles both clockwise and anticlockwise away from the direction of the float body longitudinal axis.

In a third aspect, the invention provides a float wherein the controlling means is adapted to rotate the first and second steering foils independently of each other.

In a further aspect, the invention provides a float wherein the float body comprises a buoyancy element and a keel element, and the first attachment means is comprised in the keel element.

In yet a further aspect, the invention provides a float wherein the float body comprises a buoyancy element and a keel element, and the second attachment means is comprised in the keel element.

In yet a further aspect, the invention provides a float wherein at least one of the support arrangements comprises an elongated first support member fastened at a first end to a lower part of the float body located forward of the steering foil longitudinal axis and at a second end to a first, lower end of an elongated second support member, with a first support member longitudinal axis being at a first angle to a second support member longitudinal axis, and an elongated third support member fastened at a first end to a part of the float body located aft of the steering foil longitudinal axis and at a second end fastened to a second, upper end of the elongated second support member, with a third support member longitudinal axis being at a second angle to a second support member longitudinal axis, and wherein the second support member longitudinal axis is oriented substantially parallel to the steering foil longitudinal axis of its respective steering foil In yet a further aspect, the invention provides a float wherein the third support member longitudinal axis being substantially perpendicular to the second support member longitudinal axis.

In yet a further aspect, the invention provides a float wherein the second support member longitudinal axis is oriented substantially parallel to the steering foil longitudinal axis of its respective steering foil.

In yet a further aspect, the invention provides a float wherein the float body comprises a buoyancy element and a keel element, and the first end of the elongated first support member is fastened to the keel element.

In yet a further aspect, the invention provides a float wherein the longitudinal axis of the elongated first support member, as seen from the first end thereof, is slanting away from the bottom and a side of the float body.

In yet a further aspect, the invention provides a float wherein the first and second elongated steering foils are arranged symmetrically on the float body with respect to the longitudinal float body axis.

In yet a further aspect, the invention provides a float wherein the second attachment means is located in a first longitudinal position in a direction along the float body longitudinal axis that corresponds to or is forward of a longitudinal position of the steering foil longitudinal axes.

In yet a further aspect, the invention provides a float wherein the position of the second attachment means adjustable about the first longitudinal position along the float body longitudinal axis.

In yet a further aspect, the invention provides a float wherein the controlling means includes a first input for receiving a first angle set value signal for the direction angle of the chord of a first one of the port or starboard steering foils, a first sensor adapted to sense the actual direction angle of the chord of the first steering foil, and a comparator for determining a difference between the first angle set value and the actual direction angle. Included in the controlling means is a compensator means adapted to generate a compensating control signal for the other one of the port or starboard steering foils on basis of the difference and a second angle set value signal for the direction angle of the chord of the other steering foil.

In the description of the present invention, the chord axis referring to a characteristic feature of the steering foil is for practical reasons used as reference for definition of the angle direction of the steering foil when rotated bout its axis or rotation from a reference line being stationary with respect to the float, such as for example the longitudinal axis of the float, however, any other reference being stationary with respect to the foil could equally well be selected for definition of the angle direction of the steering foil. Accordingly, a rotation of the chord of the steering foil for the purpose of steering the float would correspond to a rotation of the steering foil in a plane in which steering or positioning of the float by effected by the steering foil.

DETAILED DESCRIPTION OF THE INVENTION

In the following the present invention will be explained by way of example and with reference to the accompanying drawings, in which FIG. 1 is a port side view of the port side of an anterior part of a towable and steerable marine seismic source arrangement for use in making a seismic survey at sea comprising elongated, steerable float according to the invention;

Figure 1:
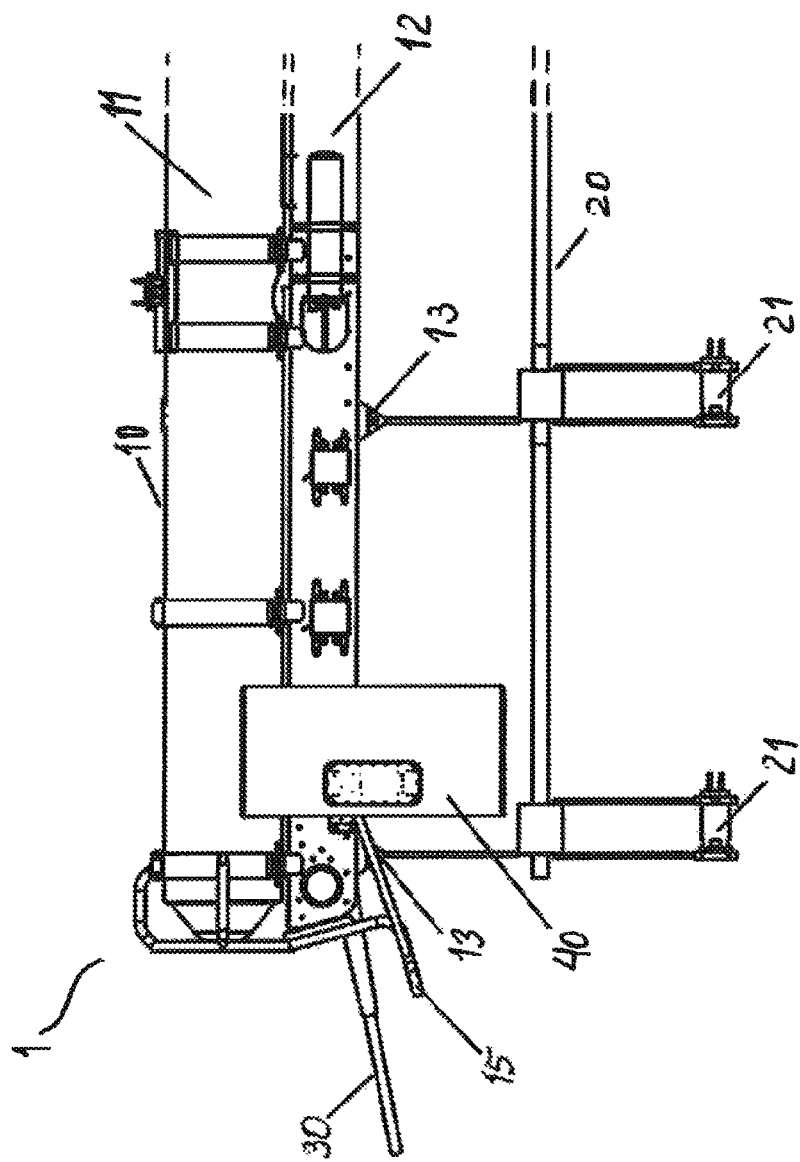

Referring now to FIG. 1, an example of a steerable, elongated float according to the invention is contemplated to be comprising a float body 10 which includes a buoyancy element 11 and a keel element 12. The keel element has first attachment means 13 that are comprised in or attached to the keel element, for holding a seismic source arrangement 20 comprising at least one seismic source 21 suspended below the float. In the illustrations, seismic source arrangement 20 includes an array of seismic sources 21, of which two are shown in FIG. 1. For towing of the float, a strength taking towing line or source umbilical 30 attached to the anterior part of the float is envisaged. A towable seismic source of the type that could comprise the float of the invention could also be provided with a bumper like arrangement 15 to protect the bow of the float on possible impact with the towing vessel at the time when it is being deployed at sea from the vessel, or at the time when it is being brought back to the vessel to serviced, or to be recovered and lifted from the sea. With the bumper like arrangement 15 illustrated in FIG. 1, which also includes a forward protruding member, the when contacting the hull of the vessel the bow of the float would be kept at sufficient distance away from the hull of the vessel to avoid excessive bending of the strength taking towing line or source umbilical. According to the present invention, steering means including a port side foil 40 shown in FIG. 1, as well as a starboards side foil 45 that in FIG. 1 is just hidden behind the port side foil 40, are provided to facilitate a wide and precise steering range to allow the seismic source to be positioned in substantially any location behind the vessel when being towed by the vessel.

Figure 2:
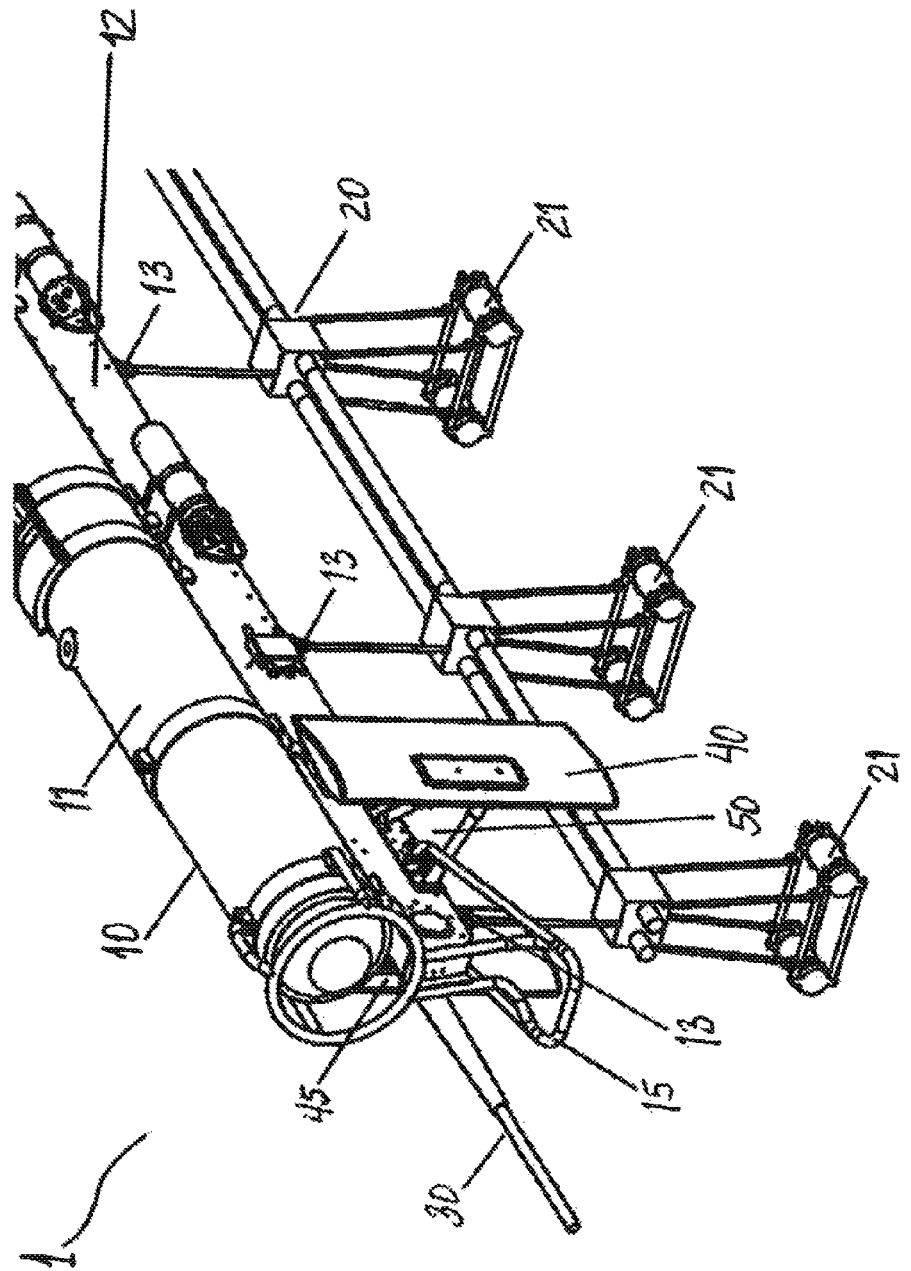
FIG. 2 is a first perspective view the anterior part of a towable and steerable marine seismic source arrangement illustrated in FIG. 1.

Referring now to FIG. 2, the example of a towable and steerable marine seismic source arrangement for use in making a seismic survey at sea comprising elongated, steerable float according to the invention, is illustrated with a seismic source arrangement 20 that includes an array of a plurality seismic sources suspended below the float, of which three seismic sources 21 that form a part of the plurality seismic sources are shown in this FIG. 2. In this FIG. 2, also the starboard side steering foil 45 is visible, as well as the port side support arrangement 50 for the respective port side steering foil 40. Seen in this FIG. 2 is also the strength taking towing line or source umbilical 30 attached to, and emerging from, the starboard side of the anterior part of the float. The strength taking towing line or source umbilical 30 is extending forwards to its point of attachment on the vessel.

Figure 3:
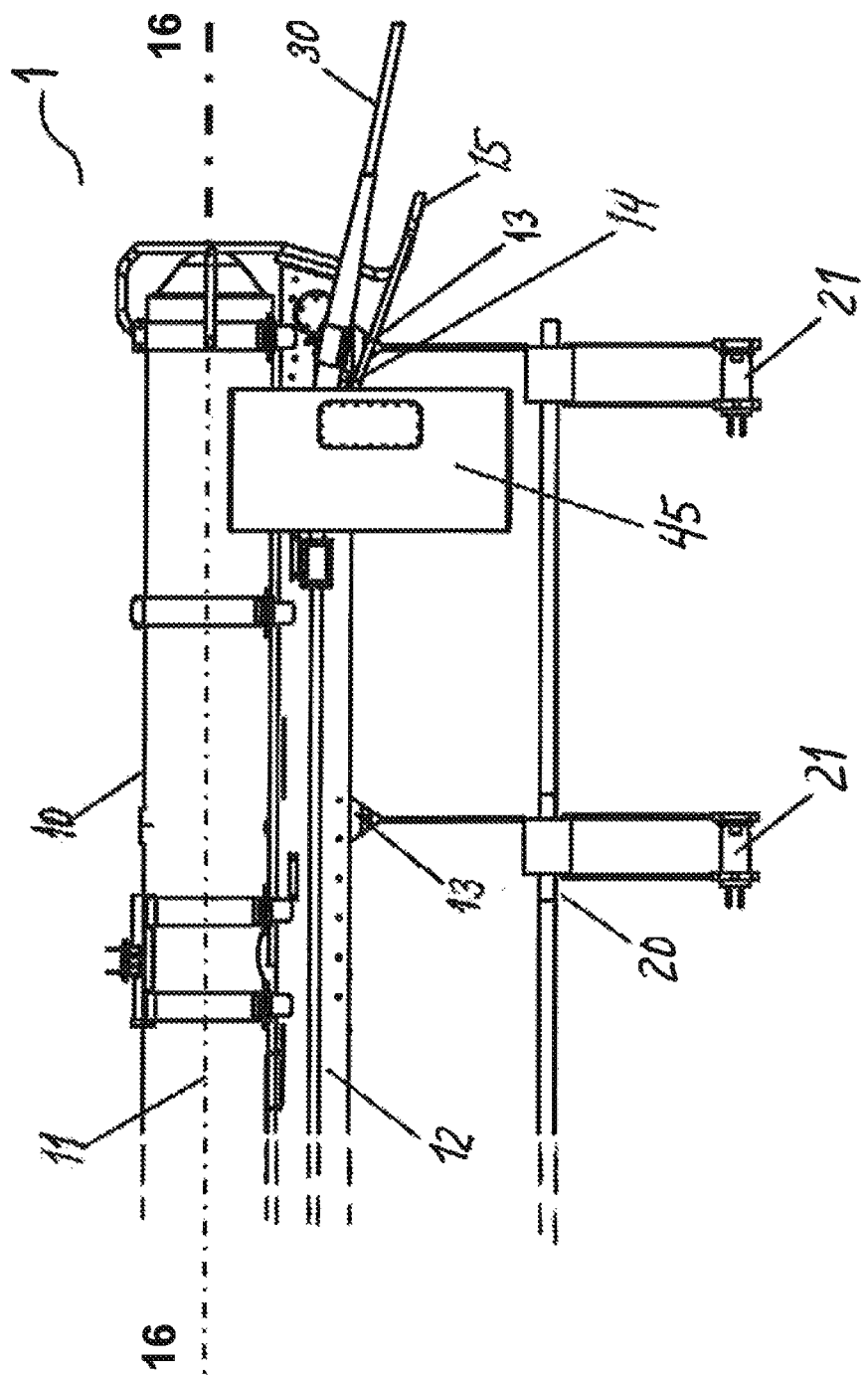
FIG. 3 is a starboard side view of the towable and steerable marine seismic source arrangement illustrated in FIG. 1.
Figure 4:
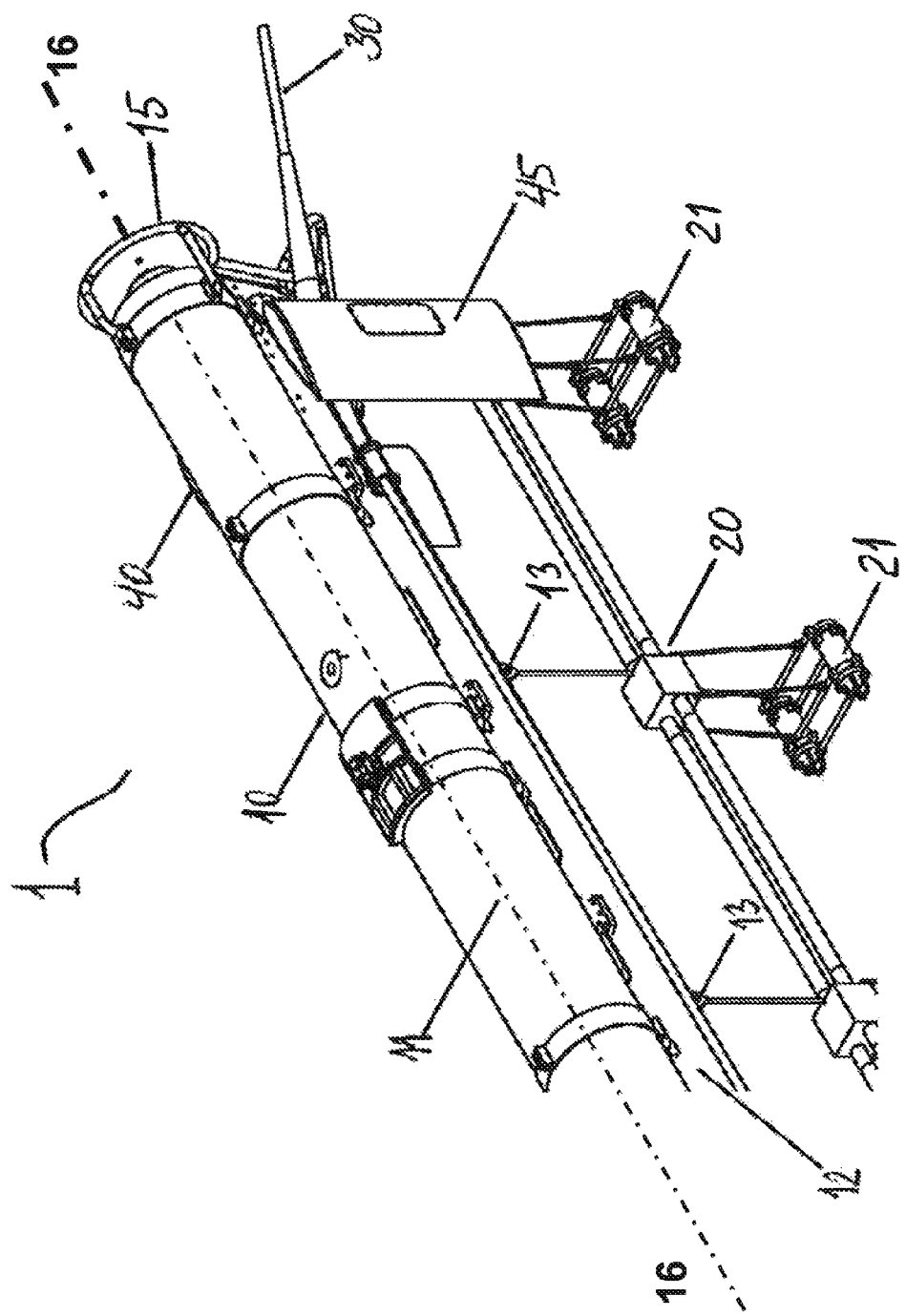
FIG. 4 is a second perspective view the anterior part of a towable and steerable marine seismic source arrangement illustrated in FIG. 1.

Referring now to FIGS. 3 and 4, the strength taking towing line or source umbilical 30 that extends forwards to its point of attachment on the vessel is more clearly shown. In FIG. 3, the location of an attachment means 14 for attaching the strength taking towing line or source umbilical 30 to the float 10, and in FIG. 4 is illustrated how the longitudinal axis of the towing line or umbilical in the neighborhood of the float would extend away from the source in a typically downward direction when the seismic source is operational and being towed at a proper distance behind and away from the towing vessel. This same FIG. 3 could also be referred to for illustrating how the longitudinal axis of the towing line or umbilical in the neighborhood of the float would extend away from the source at a sharp upwards angle that could be in a range from 60 to more than 80 degrees, and in some cases in an almost straight upward direction, when the seismic source is being deployed from or to be recovered to the vessel, at which time the bow of the float 10 would be almost in contact with the hull of the towing vessel. According to the present invention, support means 50 and 55 for the steering foils are provided, that allows the strength taking towing line or source umbilical 30 to be extending forwards from the float in a wide range of angles without interference with any part of the towed seismic source.

Figure 5:
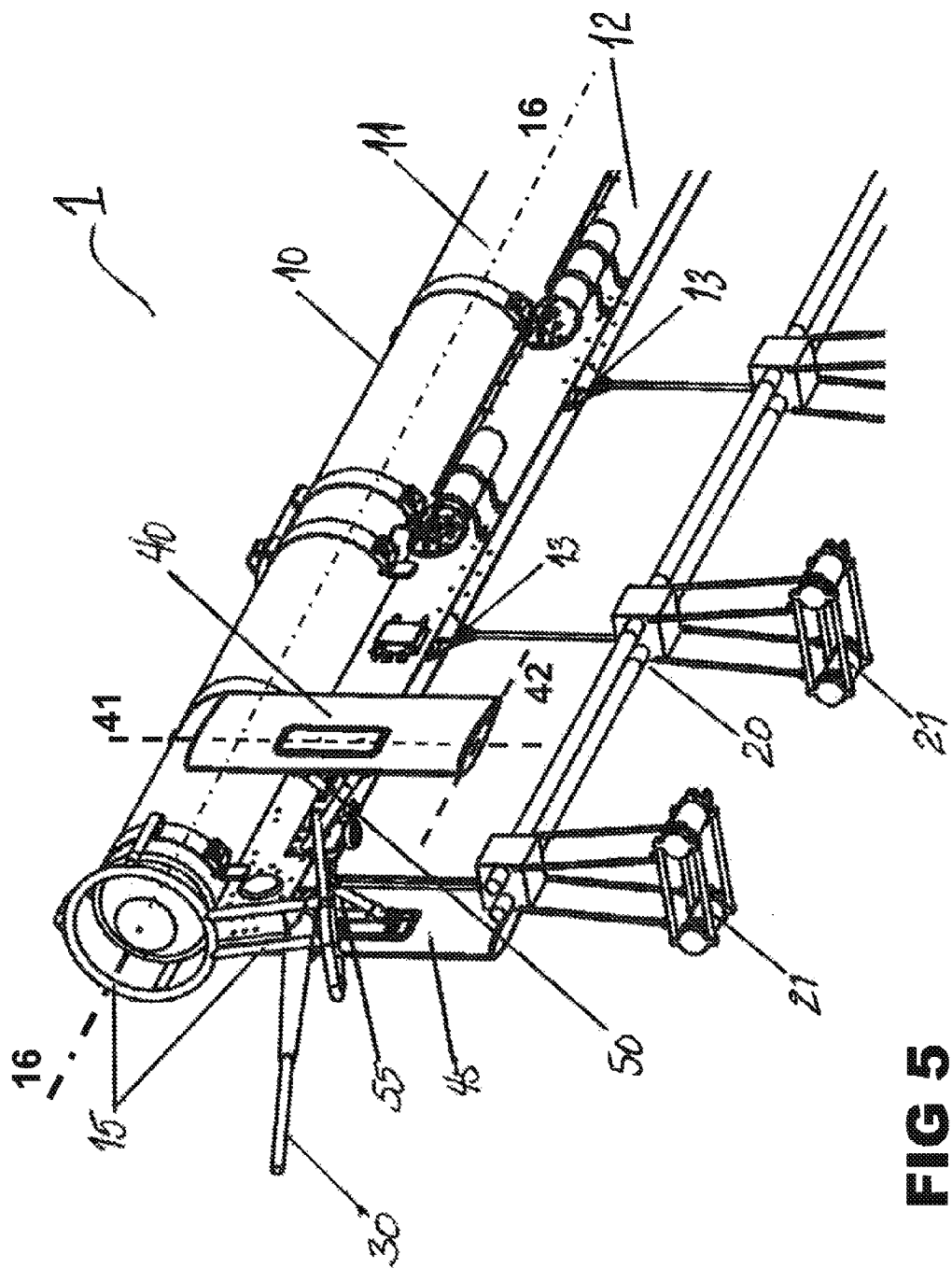
FIG. 5 is a third perspective view the anterior part of a towable and steerable marine seismic source arrangement illustrated in FIG. 1.
Figure 6:
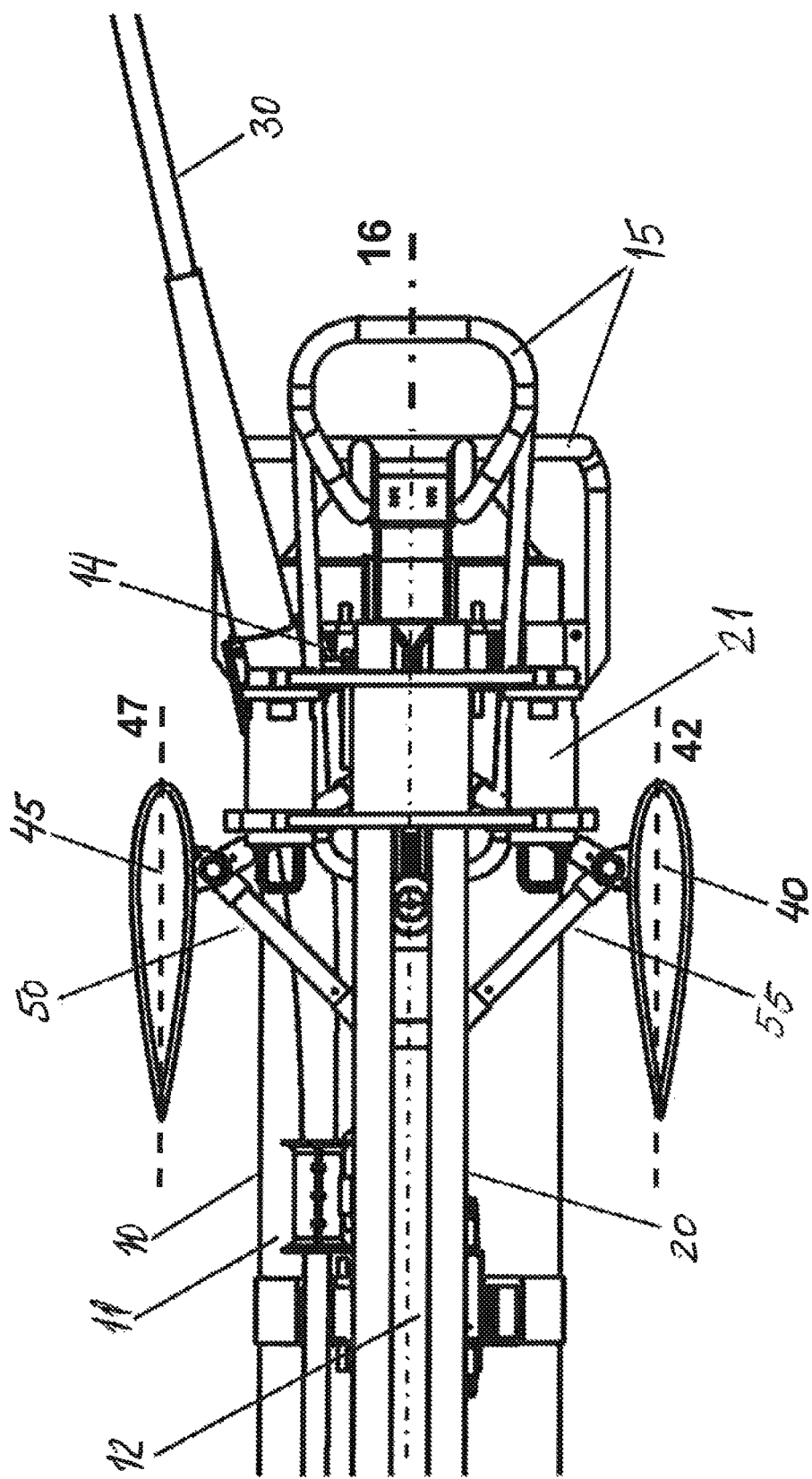
FIG. 6 is a bottom view the anterior part of a towable and steerable marine seismic source arrangement illustrated in FIG. 1.
Figure 7:
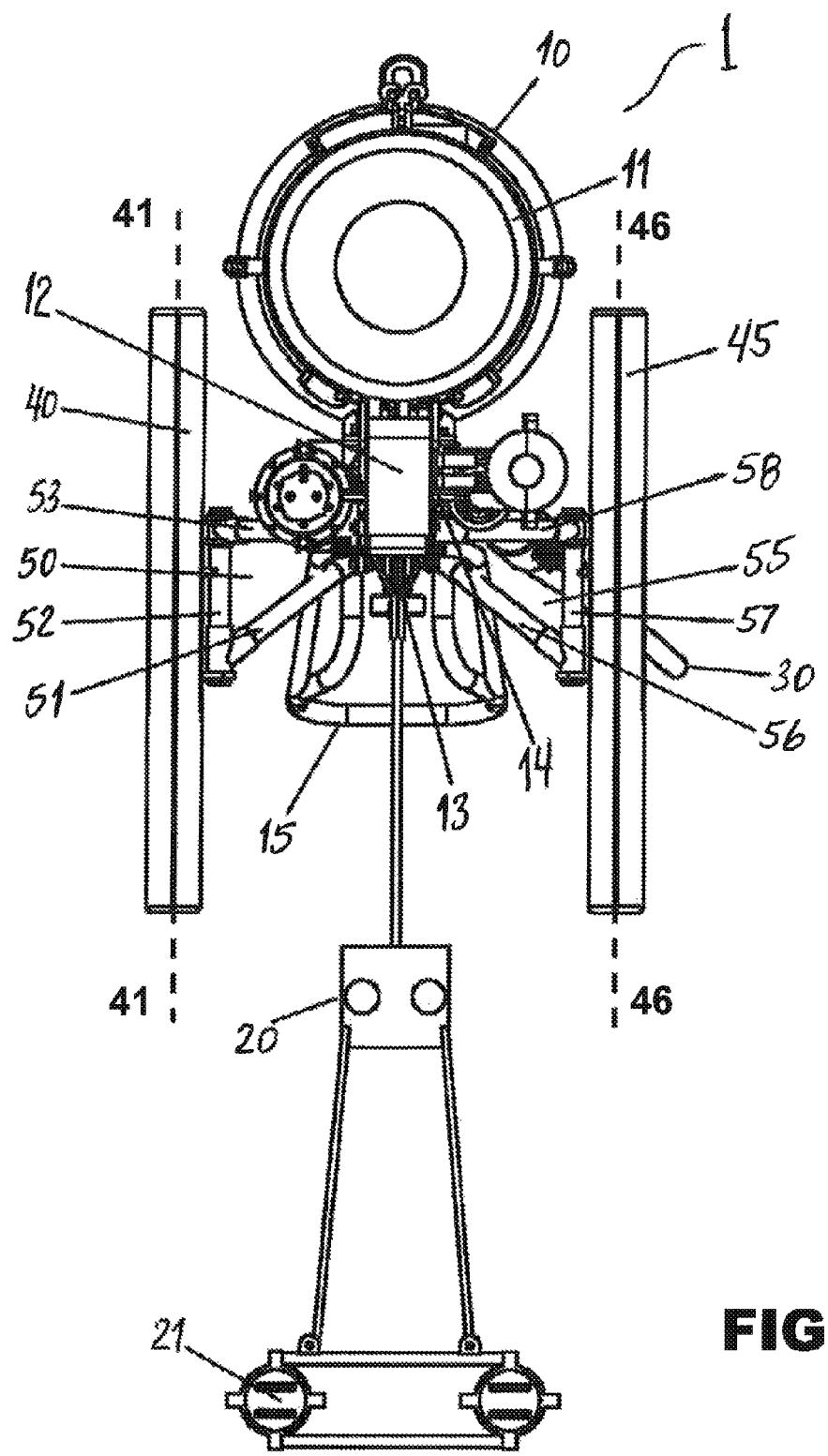
FIG. 7 is a rear view the anterior part of a towable and steerable marine seismic source arrangement illustrated in FIG. 1.
Figure 8:
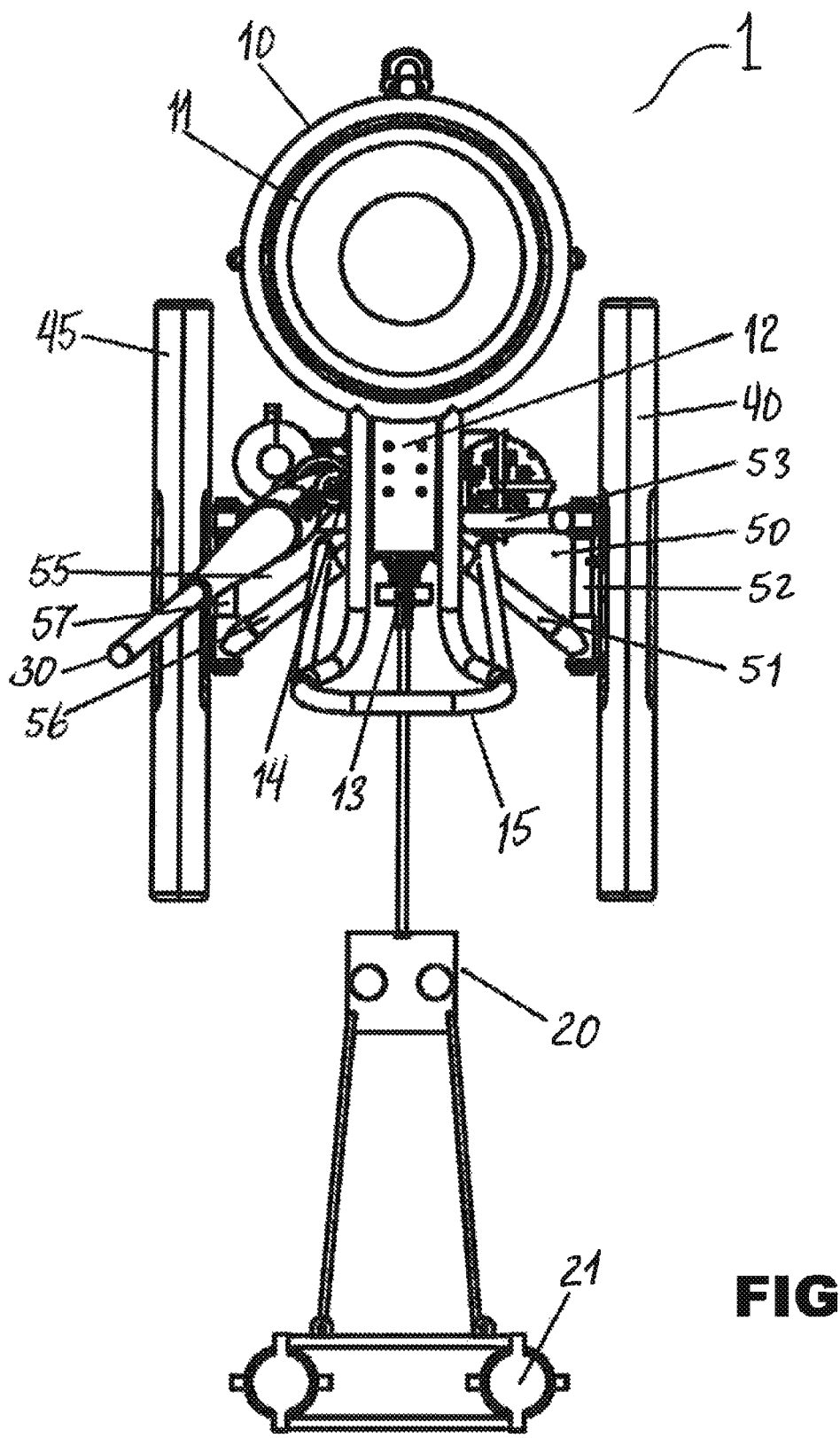
FIG. 8 is a front view the anterior part of a towable and steerable marine seismic source arrangement illustrated in FIG. 1.
Figure 9:
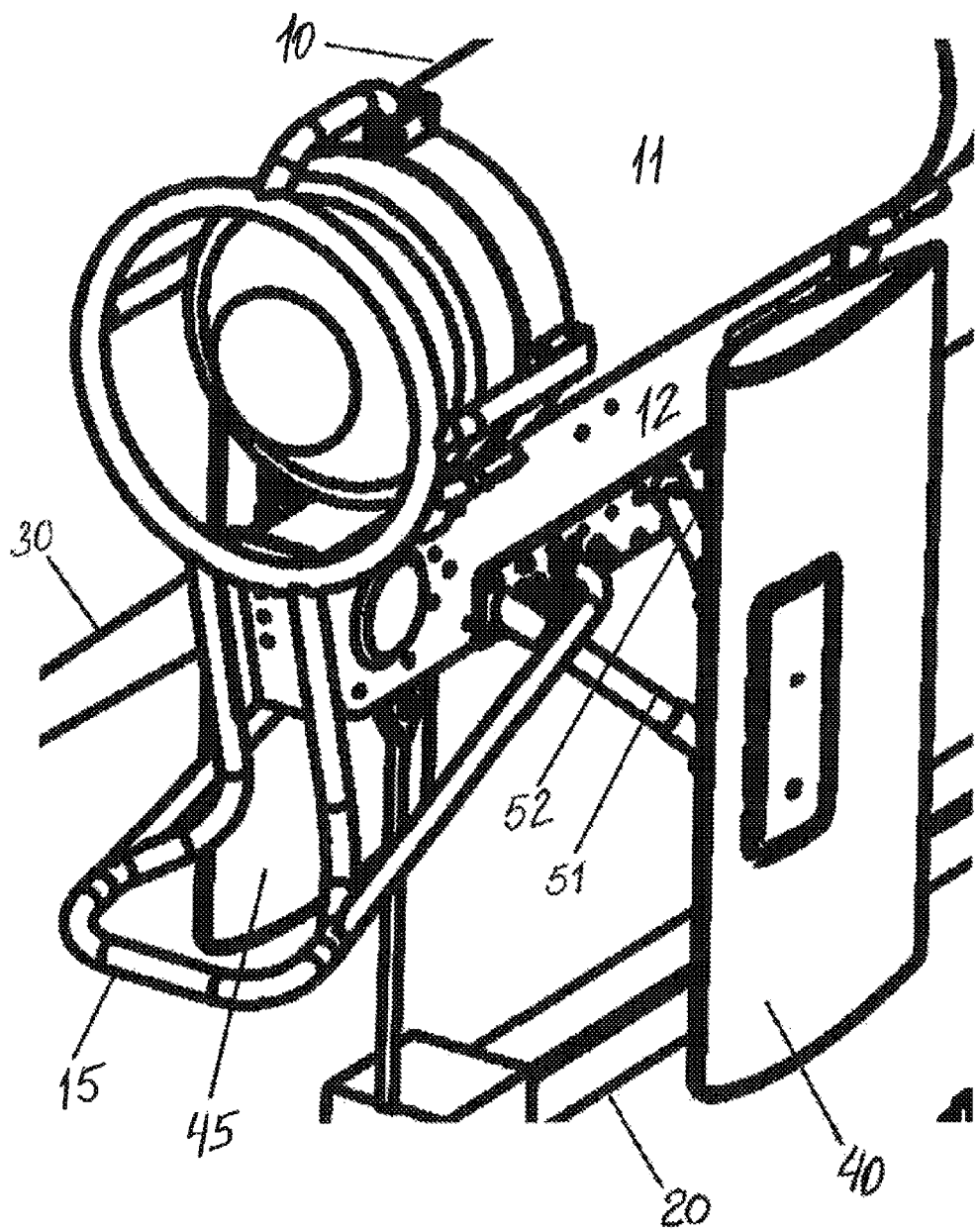
FIG. 9 is a partial and enlarged detail of the perspective view of the anterior part of a towable and steerable marine seismic source arrangement illustrated in FIG. 2.
Figure 10:
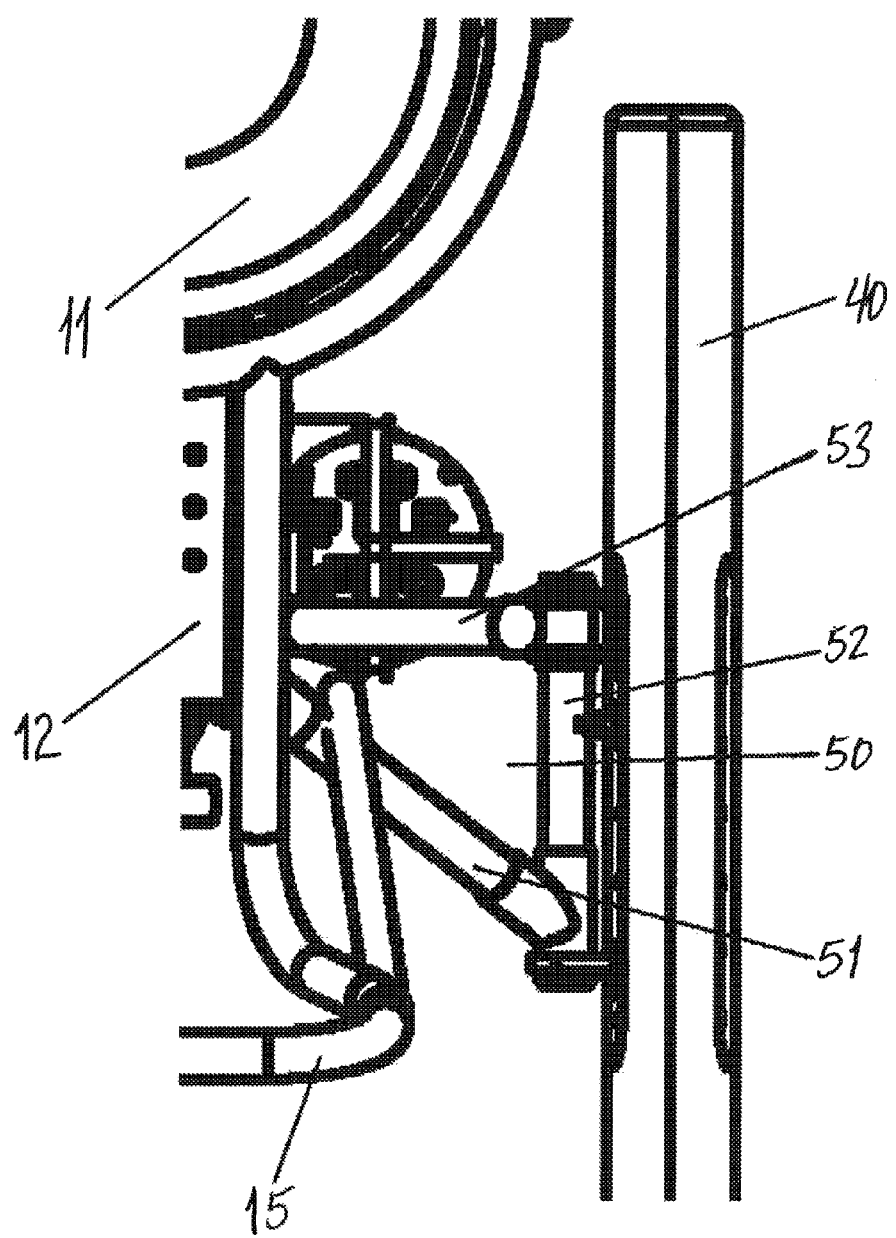
FIG. 10 is a partial and enlarged detail of the front view of the anterior part of a towable and steerable marine seismic source arrangement illustrated in FIG. 8.
Figure 11:
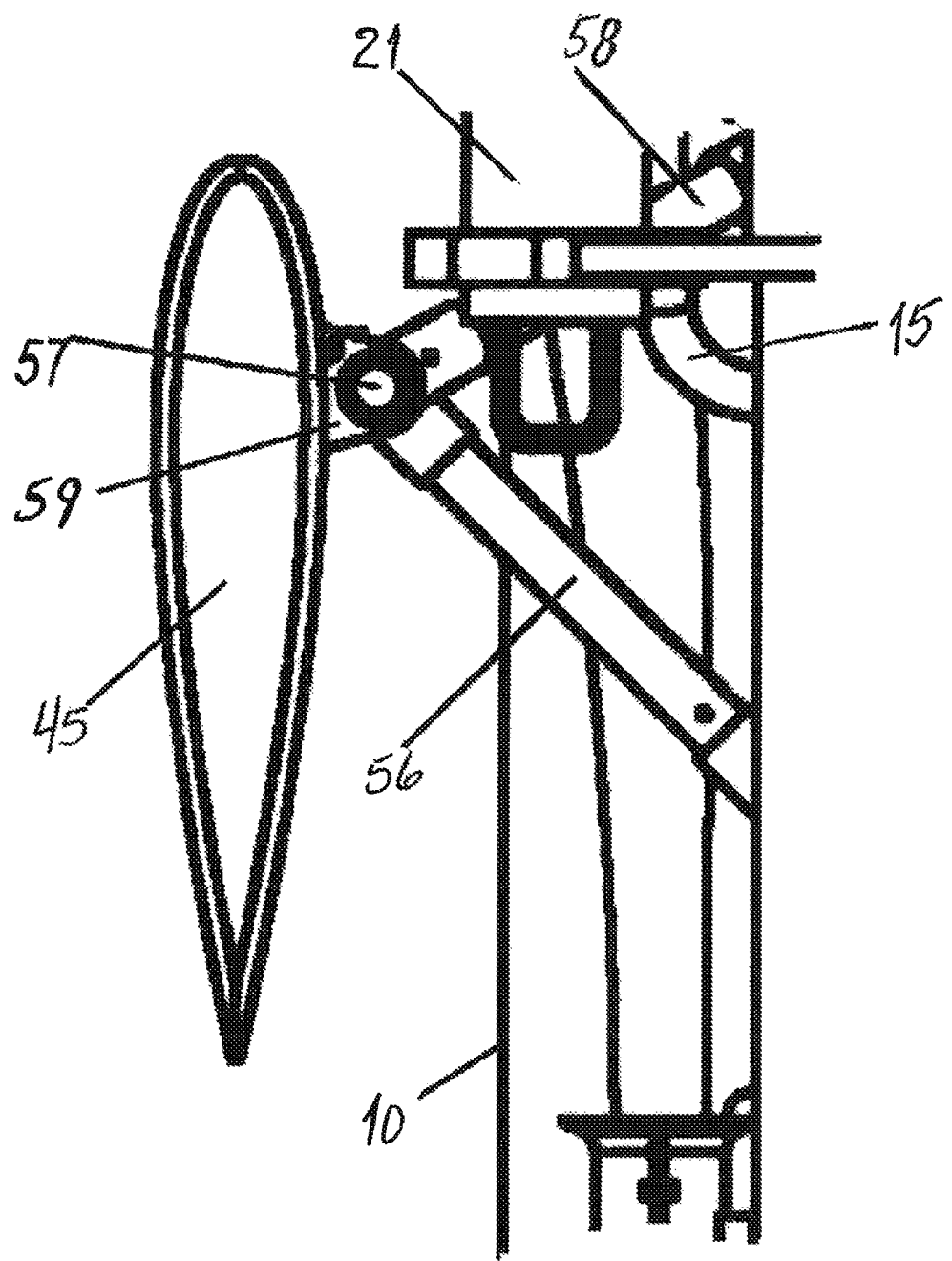
FIG. 11 is a partial and enlarged detail of the bottom view of the anterior part of a towable and steerable marine seismic source arrangement illustrated in FIG. 6.

Now reference is made to FIGS. 5 and 6, showing more details of the example of a towable and steerable marine seismic source arrangement for use in making a seismic survey at sea comprising elongated, steerable float according to the invention, and in particular the support means 50 and 55 for the steering foils 40 and 45, respectively, that are provided to maintain the steering foils 40 and 45 at their respective port and starboard sides of the float body 10, restricted from rotating about the float body 10.

Further details of the support means 50 and 55 for the steering foils 40 and 45 are illustrated in FIGS. 7 to 11. Each of the support means 50, 55 include an elongated first support member 51,56 being fastened at a first end to a lower part of the float body located forward of the steering foil longitudinal axis. At a second end thereof, the elongated first support member 51,56 is fastened to a first, lower end of an elongated second support member. A longitudinal axis of the first support member 51, 56 is at a first angle to a longitudinal axis of the second support member 52, 57. Advantageously, the first angle formed by the longitudinal axes of the first and second support members extending from the point at which they are fastened to each other is substantially less than ninety degrees. An elongated third support member 53, 58 is at a first end thereof fastened to a part of the float body 10 at a point located aft of the steering foil longitudinal axis. At a second end thereof, third support member 53, 58 is fastened to a second, upper end of the elongated second support member 52, 57, with a third support member longitudinal axis being at a second angle to a second support member longitudinal axis. Advantageously, the second angle formed by the longitudinal axes of the third support member 53, 58 and second support member 52, 57 extending from the point at which they are fastened to each other, is about ninety degrees.

Advantageously, the second support member longitudinal axis is oriented substantially in parallel to the steering foil longitudinal axis of its respective steering foil. Advantageously, the support members are fastened to each other and to the float body, and the steering foil is attached to its respective second support member by foil attachment means 59, 60, such that the longitudinal axis of the second support member 52, 57 or the steering foil longitudinal axis of the respective steering foil is oriented in a direction that is about perpendicular to a longitudinal direction of the float body 10.

Advantageously, the float comprises a buoyancy element 11 and a keel element 12, and the first end of the elongated first support member 51, 56 is fastened to the keel element. As is clearly seen form the illustrations provided in FIGS. 7, 8, 9, 10 and 11, the advantageous free angular movement of the strength taking towing line or umbilical 30 in directions forward from the float body is achieved at least in part by orientation of the elongated first support member 51, 56 such that the longitudinal axis of the elongated first support member, as seen from the first end thereof, is slanting away from the bottom and a side of the float, and in part by providing the second attachment means 14 for attaching the strength taking towing line or umbilical 30 to the float body 10 located in a first longitudinal position in a direction along the float body longitudinal axis that corresponds to or is forward of a longitudinal position of the steering foil longitudinal axes.

Steering means for the foils include actuator means, that advantageously is located within respective ones of the steering foils, thereby eliminating further struts or linkages in the space between the foils 40, 45 and the float body 10. The actuator means are typically envisaged to include a motor, driven by electricity or other power source, further controlled by a steering controller being adapted to in combination actuate the steering foils for bringing the towed seismic source to a desired position behind the towing vessel.

When towing a seismic source at a significant distance from a towing vessel, a periodic or other pattern variation of the in line position of the towed source is experienced, as the strength taking towing line or umbilical could oscillate or move in other pattern in a lateral direction with respect to the line to be followed by the towed source or the vessel. In an embodiment of the present invention, the steering controller is adapted to control the port and starboard steering foils, that is the directions of the chords of the foils, independently of each other, so as to not only control a lateral position of the towed seismic source, but also to provide a breaking action that would compensate for or even fully or to a degree eliminate the aforementioned in line or lateral position variation tendencies.

In an embodiment of the present invention, the steering controller is adapted to control the port and starboard steering foils, that is the directions of the chords of the foils, independently of each other, so as to ensure substantially equal load on the steering foils, and to compensate for different fluid dynamics on the port and starboard sides of the float body that are experienced when alternating the towing of the seismic source from the port or starboard side with respect to the towing vessel, or vice versa, without moving the side of attachment of the strength taking towing line or umbilical 30 on the float 10. Hence, one and same towed source may be located in position among a plurality of towed sources, and could without any need for reconfiguration replace any other towed source that is brought in for maintenance or repair, or could be constantly towed as a spare source for instantly replacing any other towed source among a plurality of towed seismic sources.

In an embodiment of the present invention, the controlling means contemplated may include first and second inputs for receiving respective first and second angle set value signals for the direction angle of the chord of respective ones of the port or starboard steering foils, or a common input for receiving a angle set value signal for the direction angle of the chord of both port or starboard steering foils. Employment of separate inputs for angle set value signals for each of the port or starboard steering foils facilitates individual control of the steering foils, thus also facilitating steering of the foils to different angles of their respective chord axis. By this means, the foils are useful not only for controlling a lateral position of the float with respect to the path of a towing vessel when deployed, but also for controlling drag which is useful for enhanced controlling of any one or all of position and yaw of the rowed seismic source assembly, and the tension of the strength taking towing line or umbilical or other rope, cable or similar used for towing the float behind the vessel.

Depending on a failure mode of one or more of the steering foils, the provision of separate angle set value inputs and their use for individual control of the foils will in many cases allow continued operation of the float in a more efficient way although one or both foils has suffered damage or failure, full or partial, which would not be the possible with steerable towed seismic sources employing floats of prior art, such as for example of the types that are provided with a single foil.

In an embodiment of the present invention, the controlling means contemplated may include a first input for receiving a first angle set value signal for the direction angle of the chord of a first one of the port or starboard steering foils, a first sensor adapted to sense the actual direction angle of the chord of the first steering foil, a comparator for determining a difference between the first angle set value and the actual direction angle, and a compensator means adapted to generate a compensating control signal for the other one of the port or starboard steering foils on basis of the difference and a second angle set value signal for the direction angle of the chord of the other steering foil.

Depending on a failure mode of one or more of the steering foils, the provision of the compensating control signal and its use for control of the other steering foil will in many cases allow a more efficient continued operation of the float although the first one of the foil has suffered damage or failure, full or partial.

In an embodiment of the present invention, the controlling means contemplated is adapted to generate the compensating control signal on basis also of a second angle set value signal for the direction angle of the chord of the other steering foil.

In an embodiment of the present invention, the controlling means contemplated includes a generator for generating the compensating control signal adapted to generate the compensating control signal solely on basis of the sensed actual direction angle of the chord of one or both of the steering foils, and the angle set value signal for the direction angle of one or each of the steering foils, thereby providing a means for providing locally in the towed seismic source a compensation for an incorrectly operating steering foil also in the case that a navigation system which determines the angle set value and produces angle set value signal has not been able to determine any new angle set value that may be required at the occurrence of a failure of the control arrangement for steering the direction angle of a steering foil.

In FIGS. 3, 4, 5, and 6, an approximate direction of the longitudinal axis of the float body is indicated by a dotted line marked with reference number 16. The direction of the longitudinal axis of the port and starboard foils are indicated by dotted lines marked with reference numbers 41 and 46, respectively, and the direction of the chord axis of the port and starboard foils are indicated by dotted lines marked with reference numbers 42 and 47, respectively. The direction of the chord axis of a foil is generally defined by a straight line drawn from the leading edge to the trailing edge of the foil, and perpendicular to the longitudinal axis of the foil. Since in the drawing of FIG. 5, the starboard side foil 45 is partly hidden behind the float body 10, only the direction of the chord axis of the port side foil 40 is indicated by a dotted line in that drawing. In the embodiments illustrated in the FIGS. 5 and 7, the dotted lines 41 and 46 drawn to indicate the direction of the longitudinal axis of the foils, are placed such that they provide an approximate location of the axis of rotation of the foils, hence also representing the pivot points or points of rotation of the chord axis of each foil.

In an embodiment of the towable and steerable float for a marine seismic source arrangement according to the present invention, wherein the second attachment means 14 for attaching the strength taking towing line or umbilical 30 to the float body 10 is located in the first longitudinal position in a direction along the float body longitudinal axis as illustrated in the drawings of the accompanying figures, the foils, or at least substantial parts of the foils, are at all times located in a position aft of the position of the second attachment means.

In the third aspect of the invention, wherein the controlling means is adapted to rotate the first and second steering foils independently of each other, the controlling means is adapted to control the angle of rotation of each foil about its axis of rotation differently. Advantageously, the controlling means is adapted to control the angle of rotation of each foil about its axis of rotation differently, dependent on whether the foil is located proximal to or distal from the sail line of the vessel towing the seismic source when the float is controlled to operate in a cross-line offset position. Hereinafter, the foil which under towing of the source would be located proximal to the sail line, i.e. on the survey centre line side of the float, is denoted F−, the foil located distal from the sail line is denoted F+, and the rotation angle of the foil about its axis of rotation, which is represented by the angle of the chord axis of the foil with respect to the longitudinal axis of the float body, is denoted angle-of-attack—AOA. Accordingly, F− AOA denotes the angle-of-attack of the foil on the side of the float that is facing towards the sail line, and F+ AOA denotes the angle-of-attack of the foil on the side of the float that is facing away from the sail line. Position control of the float is based on determining the combined lift force of the foils that is required to position the float in a specific cross-line offset position, based on one or more parameters, such as e.g. the actual towing velocity through water. The required combined lift force of the foils is determined by a source positioning system, and provided to the foil controlling means in a "Lift-command" message. Optimum position control of the float according to the invention as illustrated in the drawings of the accompanying figures is provided by the foil controlling means adapted to provide AOA control of the foils as follows:

$$F- \text{AOA}=A*\text{Lift-command}$$

$$F+ \text{AOA}=B*\text{Lift-command}$$

wherein A and B are control coefficients, and $|A| \neq |B|$.

Typically, $|A|<|B|$.

The pair of vertical lines embracing the coefficients A and B above, signify the absolute value of the coefficient.

In the following, a some aspects of the design of the invention considered important are elaborated upon.

For an embodiment of the float of the invention in which the profile and dimensions of the foils generally correspond to NACA0018-900×1500 mm, and "Lift-command" is issued with a value in a range from 0-100% of the maximum available angle of attack (AOA) of the foils, a value of about 20 for coefficient A and a value of about −35 for coefficient B have been found to provide the be the optimum values for controlling the position of the seismic source float for making a typical seismic survey at sea. NACA denotes airfoils with foil shapes for wings developed by the National Advisory Committee for Aeronautics (NACA).

The foil structures and foil operation envelopes are designed to provide dynamic and agile bi-directional lift control to yield a best possible performance in cross line position control of the seismic source array, taking into account varying sea state and sea current conditions, and has for an embodiment disclosed herein been found to be the one best possible suited for both straight line 3D production and non-straight line 4D production.

The foil structures and umbilical anchoring solution of the float has been designed with that in mind to minimize bridle effect of umbilical/keel for a) optimizing controllability in avoiding nonlinearity (hysteresis) in maneuvering control when operating near centre line, and b) avoiding undesirable crab angle of the array, so as to minimize drag and improve position control of gun clusters (avoiding side current that could be pushing the gun clusters to the side of the above keel).

The foil structures and foil operation envelopes have been designed to provide bi-directional, sustainable lift to feature cross centre towing, i.e. sources that normally would be used on the starboard side of the tow, can be positioned to operate at port side of centre line, without onboard reconfiguration.

The structure and foil design is designed to ensure little or no interference with the umbilical for all operation modes.

The structure is designed with a limited width in order to comply with available onboard handling and stowing space.

The structure ensures the foil lift centre to be well matched with the vertical position of the umbilical anchoring point in order to limit roll inducing torque on gun string float and keel, particularly at high foil deflection.

The foil structure is designed symmetrically to allow usage of identical main components at starboard and port side, such as e.g. actuators and motors, basic foil panels, and hinge brackets.

The foil and foil structure placement on the keel of the float ensures minimal or no interference with any gun string equipment (air guns etc), and for not being prone to collision when being handled by winch and boom near stern of towing vessel.

The foil structure has been designed to accommodate an inline integrated motor and gear for foil actuation, for reducing the number and volume of movable parts down to one rotating axle (per foil), through enclosure protecting motor mechanics and electronics, and for minimizing any possible backlash in transmission and control loops.

The foil integrated motor and gear have been designed and mounted with output shaft pointing downwards, for preventing damage from water ingress.

The foil structure is designed to allow independent foil control on each side, increasing robustness by redundancy.

Advantages

Employment of the present invention would eliminate or reduce the need for or use of distance ropes to keep a plurality of towed sources in desired cross line positions, and brings the advantage of redundancy to each towed seismic source that could be towed at either side of the vessel, or moved to a new position or to replace another towed seismic source as already deployed, without need for bringing the source back to the vessel for reconfiguration and redeployment, while maintaining accurate an position of the towed seismic when deployed and in operation.

What is claimed is:

1. A towable and steerable elongated float for a marine seismic source arrangement for use in making a seismic survey at sea, the float comprising:
    a float body, having a first attachment at a lower or bottom part of the float body for allowing at least one seismic source to be suspended from the float, and a second attachment located on a fore part of the float body in a first longitudinal position in a direction along a longitudinal axis of float body, for attachment of a strength taking source towing member or umbilical;
    first and second elongated steering foils being attached to and spaced from respective port and starboard sides of the fore part of the float body by respective port and starboard sides support arrangements, the elongated steering foils having respective steering foil longitudinal axes being held substantially unrotatable with respect to the longitudinal axis of the float body and oriented in a direction substantially perpendicular relative to the float body longitudinal axis, so as to be positioned substantially perpendicular to a sea surface by the float body when in use, the elongated steering foils having respective first and second chord axes that are perpendicular to the respective steering foil longitudinal axes; and
    a foil direction controlling unit for controlling a direction angle of at least one of the first and second chord axis with respect to the longitudinal axis of the float body,
    wherein the first and second foils, or at least substantial parts of the first and second foils, are at all times located in a longitudinal position aft of the first longitudinal position of the second attachment.

2. The float of claim 1, wherein a respective steering foil profile of each of the first and second steering foils is substantially symmetrical about the chord axis.

3. The float of claim 1, wherein the foil direction controlling unit is adapted to rotate at least one steering foil about an axis of rotation coinciding with or being substantially parallel to the steering foil longitudinal axis, for directing the cord axis of the at least one steering foil in directions both clockwise and anticlockwise away from the direction of the longitudinal axis of the float body.

4. The float of claim 1, wherein the foil direction controlling unit is adapted to rotate the first and second steering foils independently of each other.

5. The float of claim 1, wherein the foil direction controlling unit is adapted to control the rotation of the first and second steering foils in accordance with a lift command provided by a positioning system when towing the float and source arrangement in a cross-line offset position and making a seismic survey at sea, such that the absolute value of an angle-of-attack of one of said foils located proximal to a sail line or center line is different from an angle-of-attack of another one of said foils located distal from a sail line.

6. The float of claim 5, wherein the absolute value of the angle-of-attack of said one of said foils is smaller than an angle-of-attack of said another one of said foils.

7. The float of claim 1, wherein the float body comprises a buoyancy element and a keel element, and the first attachment is comprised in the keel element.

8. The float of claim 1, wherein the float body comprises a buoyancy element and a keel element, and the second attachment is comprised in the keel element.

9. The float of claim 1, wherein at least one of the port and starboard sides support arrangements comprises
an elongated first support member fastened at a first end to a lower part of the float body located forward of the steering foil longitudinal axis and fastened at a second end to a first, lower end of an elongated second support member, with a first support member longitudinal axis being at a first angle to a second support member longitudinal axis, and
an elongated third support member fastened at a first end to a part of the float body located aft of the steering foil longitudinal axis and fastened at a second end to a second, upper end of the elongated second support member, with a third support member longitudinal axis being at a second angle to a second support member longitudinal axis, and
wherein the second support member longitudinal axis is oriented substantially parallel to the steering foil longitudinal axis of its respective steering foil.

10. The float of claim 9, wherein the third support member longitudinal axis is oriented substantially perpendicular to the second support member longitudinal axis.

11. The float of claim 9, wherein the second support member longitudinal axis is oriented substantially in parallel to the steering foil longitudinal axis of its respective steering foil.

12. The float of claim 9, wherein the float comprises a buoyancy element and a keel element, and the first end of the elongated first support member is fastened to the keel element.

13. The float of claim 9, wherein the longitudinal axis of the elongated first support member, as seen from the first end thereof, is slanting away from the bottom and a side of the float.

14. The float of claim 9, wherein the first and second elongated steering foils are arranged symmetrically on the float body with respect to the longitudinal axis of the float body.

15. The float of claim 9, wherein the second attachment means is located in a first longitudinal position in a direction along the float body longitudinal axis of the float body, forward of a longitudinal position of the axis of rotation of the steering foils.

16. The float of claim 15, wherein the position of the second attachment is adjustable about the first longitudinal position in a direction along the longitudinal axis of the float body.

17. The float of claim 1, wherein the controlling unit includes a first input for receiving a first angle set value signal for the direction angle of the chord of a first one of the port or starboard steering foils, a first sensor adapted to sense the actual direction angle of the chord of the first steering foil, a comparator for determining a difference between the first angle set value and the actual direction angle, and a compensator unit adapted to generate a compensating control signal for the other one of the port or starboard steering foils on basis of the difference and a second angle set value signal for the direction angle of the chord of the other steering foil.

18. The float of claim 1, wherein the controlling unit includes first and second inputs for receiving respective first and second angle set value signals for the direction angle of the chord of respective ones of the port or starboard steering foils, or a common input for receiving a angle set value signal for the direction angle of the chord of both port or starboard steering foils, providing employment of separate inputs for angle set value signals for each of the port or starboard steering foils facilitates individual control of the steering foils, for facilitating steering of the foils to different angles of their respective chord axis for controlling a lateral position of the float with respect to the path of a towing vessel when deployed, and for controlling drag useful for enhanced controlling of any one or all of position and yaw of the rowed seismic source assembly, and the tension of the strength taking umbilical or other rope, cable or similar used for towing the float behind the vessel.

19. The float of claim 1, wherein the controlling unit includes a first input for receiving a first angle set value signal for the direction angle of the chord of a first one of the port or starboard steering foils, a first sensor adapted to sense the actual direction angle of the chord of the first steering foil, a comparator for determining a difference between the first angle set value and the actual direction angle, and a compensator unit adapted to generate a compensating control signal for the other one of the port or starboard steering foils on basis of the difference and a second angle set value signal for the direction angle of the chord of the other steering foil.

20. A towable and steerable elongated float for a marine seismic source arrangement, the float comprising:
a float body having an attachment located on a fore part of the float body in a first longitudinal position along a longitudinal axis of float body, for attaching an umbilical;
first and second elongated steering foils attached to and spaced from respective port and starboard sides of the float body by respective port and starboard sides support arrangements;
the elongated steering foils having respective steering foil longitudinal axes being held fixed with respect to a longitudinal axis of the float body and oriented in a direction substantially perpendicular relative to the longitudinal axis of the float body, the elongated steering foils having respective first and second chord axes, that are perpendicular to the respective steering foil longitudinal axes; and
a foil direction controlling unit for controlling a direction angle of at least one of the first and second chord axis with respect to the longitudinal axis of the float body, wherein the first and second foils are at all times located in a longitudinal position aft of the longitudinal position of the attachment.

* * * * *